United States Patent [19]

Bacardit

[11] 3,914,942
[45] Oct. 28, 1975

[54] SERVO-ASSISTED FLUID SUPPLY SYSTEMS

[75] Inventor: Juan Simon Bacardit, Barcelona, Spain

[73] Assignee: Bendiberica, S.A., Barcelona, Spain

[22] Filed: May 13, 1974

[21] Appl. No.: 469,527

[30] Foreign Application Priority Data
May 23, 1973   Spain .................................. 415362

[52] U.S. Cl. ................ 60/581; 188/345; 303/21 AF
[51] Int. Cl.² ............................................ F15B 7/00
[58] Field of Search ............ 60/581, 539, 549, 561, 60/562, 571, 576; 188/345; 303/21 AF

[56] References Cited
UNITED STATES PATENTS

| | | | |
|---|---|---|---|
| 2,526,570 | 10/1950 | Majneri | 188/345 X |
| 3,173,261 | 3/1965 | Chovings | 60/581 X |
| 3,550,377 | 12/1970 | Mochinzuki et al. | 188/345 X |
| 3,706,479 | 12/1972 | Klein | 188/345 X |
| 3,760,912 | 9/1973 | Braun | 188/345 |

*Primary Examiner*—Martin P. Schwadron
*Assistant Examiner*—H. Burks, Sr.
*Attorney, Agent, or Firm*—Steinberg & Blake

[57] ABSTRACT

In a fluid supply system having a servo-motor which when actuated assists the pistons of a plurality of independent amplifier cylinders to deliver working fluid to the respective outputs. Actuating means for the servo-motor are provided which actuate the servo-motor when the control fluid pressure in any one of the amplifier cylinders reaches a respective predetermined level, so that failure of one amplifier cylinder or one output does not impair the working of the servo-motor.

10 Claims, 8 Drawing Figures

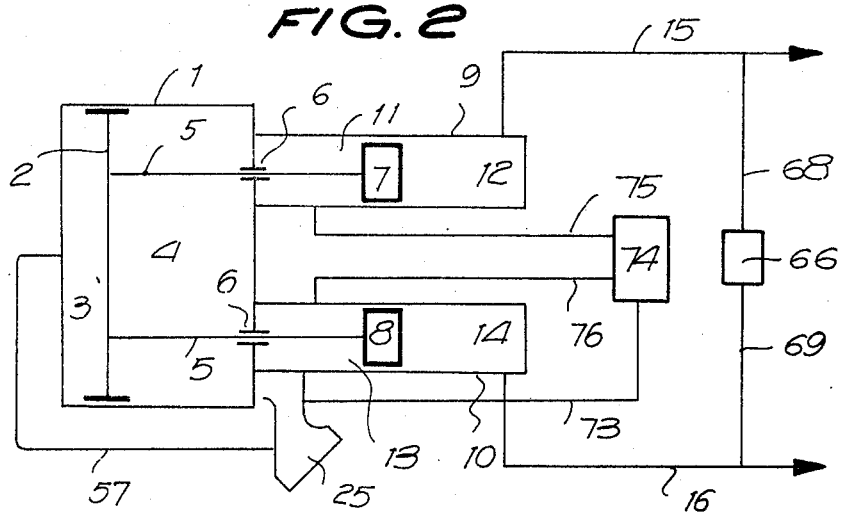
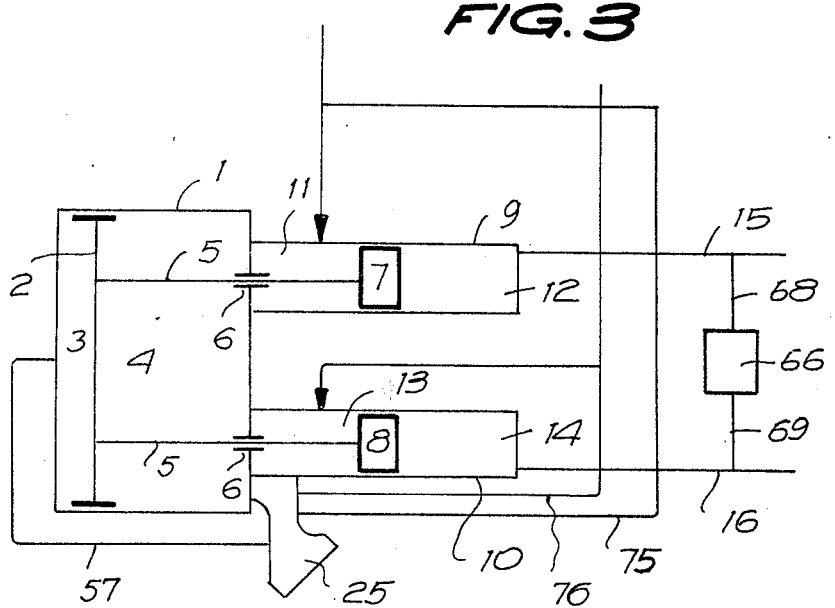

SERVO-ASSISTED FLUID SUPPLY SYSTEMS

BACKGROUND OF THE INVENTION

1. Field of the Invention

The present invention relates to servo-assisted fluid supply systems for supplying working fluid under pressure and in a controlled manner to a plurality of independent outputs. The system may be hydraulic or pneumatic or may employ both media. The invention is particularly though not exclusively applicable to automobile vehicle braking systems.

2. Description of the Prior Art

A typical hydro-pneumatic braking system has two or more hydraulic master cylinders delivering fluid to independent brake circuits. The pistons of the master cylinders are connected to a common servo-motor which assists or boosts the effort applied to the pistons by hydraullic fluid supplied by control cylinders. Pneumatic pressure or negative pressure, i.e. pressure below atmospheric pressure, is employed to operate the servo-motor. Valves actuated by the control cylindrs actuate the servo-motor.

Known systems of this kind have attempted to meet modoern safety standards, using circuits independent of the braking installations and assisted by power boosters using pneumatic pressure or negative pressure available on the vehicle. They have not been entirely satisfactory, as they afford only a partial degree of safety and are complicated and not always very reliable in operation.

SUMMARY OF THE INVENTION

It is an object of the invention to overcome some at least of the disadvantages of such known systems.

According to the invention there is provided a servo-assisted arrangement for supplying working fluid under pressure and in a controlled manner to a plurality of independent outputs, wherein independent amplifier cylinders are operated so as to supply working fluid to the respective outputs by control fluid supplied to the amplifier cylinders by respective master cylinders, and a common servo-motor actuated by the control fluid pressure assists the pistons of the amplifier cylinders when the master cylinders are operated, there being provided actuating means for the servo-motor arranged to actuate the servo-motor when the control fluid pressure obtaining in any one of the amplifier cylinders reaches a respective predetermined level. The predetermined levels at which the control fluid pressures existing in the amplifier cylinders will usually be the same, or close to each other. Thus in the arrangement of the invention, if any one of the independent supply circuits fails, either in the supply system itself or in the output, control fluid pressure in another amplifier cylinder can actuate the servo-motor.

Preferably the master cylinders are actuated in commmon, e.g. by the brake pedal of a vehicle.

Preferably, the actuating means for the servo-motor includes a selector valve having two inlets and an outlet and a shuttle member movable to close off from the outlet either one of its inlets when there exists in that inlet a substantially lower pressure than exists in the other.

This selector valve may be arranged with its inlets connected respectively to the outlets of two servo-valves actuatable by control fluid pressure in respective ones of the amplifier cylinders to admit operating fluid for the servo-motor to the selector valve and thence to the servo-motor, so that the selector valve closes off either inlet should operating fluid fail to be applied to that inlet. Alternativey, and more simply, control fluid pressure obtaining in respective amplifier cylinders may be applied to the selector valve inlets, the outlet being connected to the control inlet of a single servo-valve actuable by sufficient fluid pressure in its control inlet to cause operation of the servo-motor.

In another simple and advantageous arrangement, the actuating means for the servo-motor includes a servo-valve actuable to cause the establishment of said pressure difference which operates the servo-motor by fluid applied at sufficient pressure at any one of a pluralilty of control inlets of the servo-valve, the control fluid applied to the respective amplifier cylinders being respectively applied to the said control inlets.

Preferably at least two said outputs are connected to a differential accumulator device having a capacity sufficiently large to compensate for differences in the consumption between the two outputs and sufficiently small not to seriously impair the functioning of one of the outputs if the other fails.

BRIEF DESCRIPTION OF THE DRAWINGS

Further features which may form part of the invention and otoher advantages obtainable with the invention will appear from the following description of several preferred embodiments given as non-limitative examples and described with reference to the accompanying drawings, wherein:

FIG. 2 is a diagram illustrating another fluid supply system embodying the invention also having two outputs, but having one servo-valve only;

FIG. 3 is a diagram illustrating a third fluid supply system embodying the invention having a servo-valve having two control fluid inlets;

DESCRIPTION OF THE PREFERRED EMBODIMENTS

The examples of the invention illustrated system, of braking installations for automobile vehicles having two brake circuits and provided with a servo hydraulic circuit and assisted by a negative pressure or vacuum operated servo-motor acting as a booster applying to the piston rods of the amplifier cylinders actuating the two brake circuits a supplementary force which may be proportional to the pressure applied to the piston thereof by a double master cylinder. Nevertheless, it will be appreciated that the improvements constituting the subject of the invention are also applicable to wholly hydraulic installations or installations involving other combinations of working fluids. The description given hereinbelow is thus based exclusively on hydraulic installations assisted by negative pressure servo-cylinders. It is also important to point out that installations such as those cylinders, be used also for other systems where two or more outputs are simultaneously supplied with fluid and it is desired that failure of one of the circuits will not interfere with the functioning of the others.

Figure 1:
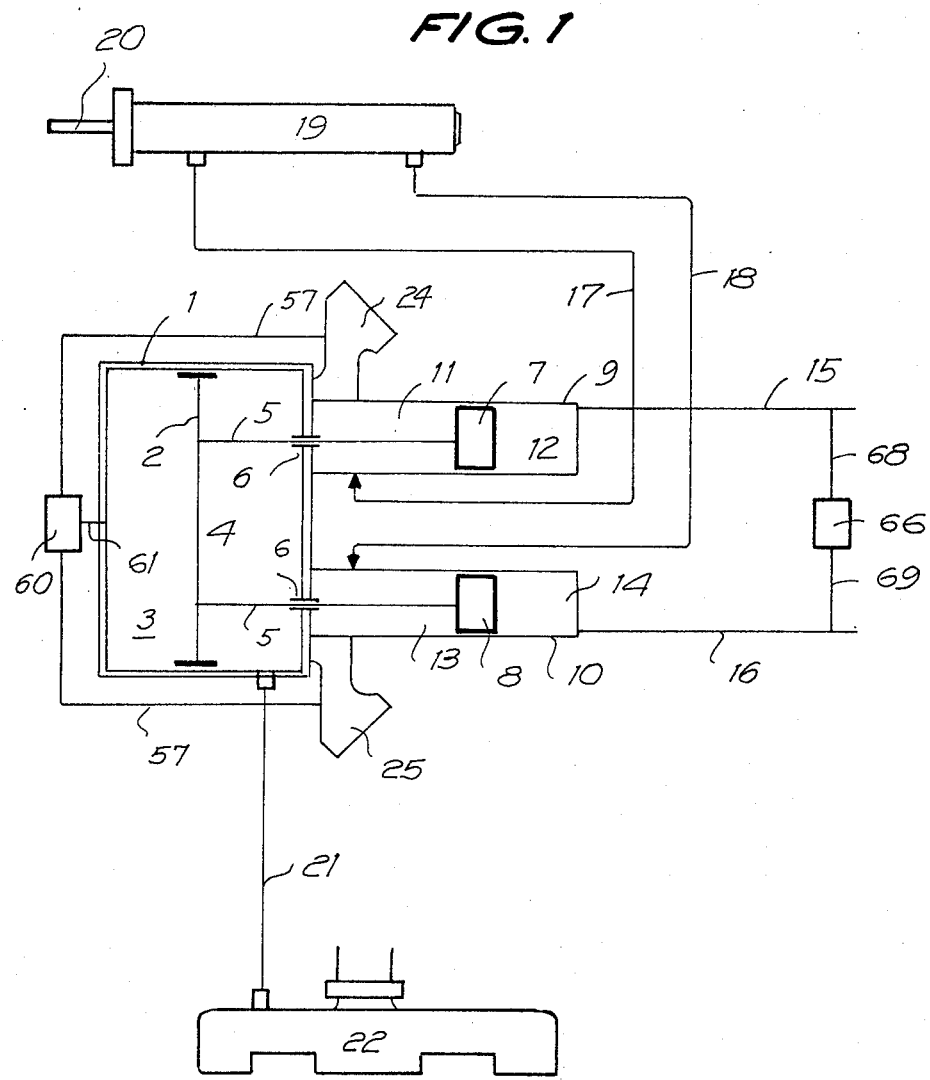
FIG. 1 is a diagram illustrating a fluid supply system embodying the invention having two outputs and including two servo-valves in the servo-motor actuating means.

Referring to FIG. 1, the servo-motor has a cylinder 1 having a piston 2 of the diaphragm or sliding type, which divides the cylinder into two independent working chambers 3, 4. Fast with the piston are two rods 5 extending parallel to the axis of the cylinder 1 and projecting through packings 6, providing fluid-tight seals, and connected to pistons 7, 8 of respective amplifier cylinders 9, 10, there being thus formed in the amplifier cylinders pairs of sealed and independent chambers 11, 12 and 13, 14.

From the chambers 12, 14 most remote from the servo-motor cylinder 1 extend respective hydraulic output circuits 15, 16, for example to the front and rear brake drums, respectively, of the vehicle. To the chambers 11, 13 of the cylinders 9, 10 adjacent to the cylinder 1 are connected control fluid lines 17, 18 for the supply of control fluid from a double master cylinder 19 containing in fact two master cylinders actuated in common by a rod 20 connected to the system actuation means, in this case the brake pedal (not shown) of the vehicle.

Actuation of the master cylinder 19 drives fluid under pressure through the lines 17, 18 to the chambers 11, 13, in such manner as to drive the pistons 7, 8 towards the right in FIG. 1. The pistons 7, 8 drive the working fluid in the chambers 12, 14 through the output circuits 15, 16 to the wheel brakes. If failure should take place in either of the two lines 17, 18 or either of the circuits 15, 16, the other circuit continues to be in the operational condition and is able to continue to function until the failure has been remedied.

The system as described functions with the power which the master cylinder 19 is able to supply and, consequently, responds to the physical pressure applied by the driver on the brake pedal. In order to interrupt this interdependence, the booster cylinder 1 is operated by operating fluid in the form of atmospheric air on one side of piston 2 opposed to negative pressure or vacuum on the other side of the piston 2 obtained from the intake manifold of the vehicle motor, thereby applying additional power to the pistons 7, 8. For this purpose, a conduit 21 extends from the chamber 4 of the cylinder 1 to the intake manifold 22 of the vehicle engine, downstream of the carburettor or of a throttle valve in the case of deisel engines. The end face of the chamber 4 (the righthand end in FIG. 1) has two large ports 23 (see FIG. 4) which are arranged diametrically opposite each other and in which there are mounted respective switching and modulating servo-valves 24, 25 which together with a selector valve 60 (FIG. 5) comprise actuating means for the servo-motor.

The two servo-valves 24, 25 are identical and a description will be given below of only one of them, 24, with reference to FIG. 4. In the description the outer direction is taken to be with respect to the cylinder 1, i.e. towards the right in FIG. 4.

The mouth of the port 23 has secured to it by means of screws 26 a part frusto-conical tubular member 27 having within it an intermediate frusto-conical partition 28 at the narrow end of which there is located an aperture 29 surrounded at the outer side (with respect to the cylinder 1) by an associated valve seat. A valve disc 30 is normally urged against the seat around the aperture 29 by a conical compression spring 31 bearing at its other end against a perforated disc 32 which is retained in position against a step 33 by an expanding ring 34. Outwardly of the ring 34 is a filter assembly 35 for filtering the air aspired into the interior of the apparatus during functioning; the assembly 35 is retained in position by a further perforated disc 36 and an associated expanding ring 37, which is readily withdrawn for replacing the filter.

The disc 30 is carried by an axial pin 38 which extends through the aperture 29 and carries, within the tube 27 a large obturating disc 39. The screws 26 also secure the periphery of a flexible and impermeable diaphragm designated by the general reference numeral 40 and constituted by a flexible annulus 41, an annular member 42 having an axial passage aperture 43, a valve seat axially outwardly of the aperture 43 for the disc 39, and inwardly of the aperture 43 a perforated dish 44, from which extends axially inwardly an actuating rod 45.

Across the port 23 extends a bridge 46 the central portion of which is formed with a blind cavity 47 open towards the above-described diaphragm 40 and formed with an internal screw thread in which is secured a cylindrical member 48 having at its outer end a flange 49 sealed in fluid-tight manner against the outer edge of the said cavity 47, its inner end being slightly spaced from the end face of the cavity 47. Mounted for sliding within the cylindrical member 48 is a piston 50 having retaining means 51 and a recess at its forward end which receives the actuating rod 45. A tapered compression spring 52 is compressed between the member 42 and the member 27 in such a manner that it urges the diaphragm 40 inwardly towards the inoperative position shown in FIG. 4, wherein the piston 50 bears against the end face of the cavity 47.

The sides of the cavity 47 are formed with grooves 53 establishing communication between the end face thereof and the upper and lower portions thereof. Opening into the upper groove 53 is a purging device 54 which it is assumed is adequately known; into the lower grove 53 debouches a conduit 55 extending along the bridge 46 and communicating, via the body of the device, with the chamber 11 or 13 of the respective adjacent clyinder 9 or 10. The conduit 55 is the control inlet of the valve.

The valve 24 thus has two inlets, viz. a first inlet 23 and a second inlet from the atmosphere through the filter 35, to its chamber 56 delimited between the diaphragm 40 and the partition 28, from which extends on outlet conduit 57 the purpose of which will be described later.

Figure 5:
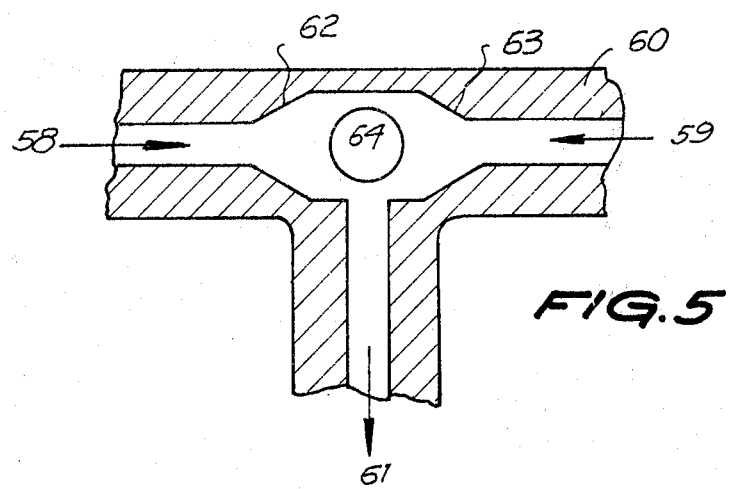
FIG. 5 is a view, on an axial section, of the selector valve of the system of FIG. 1.

The outlet conduits 57 of the two valves 24, 25 are connected, respectively, to the two inlets 58, 59 of a selector or differential valve means 60 shown in FIG. 5, which has a single oulte 61 communicating with the chamber 3 of the cylinder 1. Formed within the valve 60 are two opposed frusto-conical seats 62, 63 against either one of which there is arranged to close a shuttle member in the form of a ball 64 freely movable within the valve. Thus when there is substantial pressure difference between the two inlets 58, 59, the ball 64 will close off from the outlet 61 the one of the inlets in which lower pressure exists.

Figure 4:
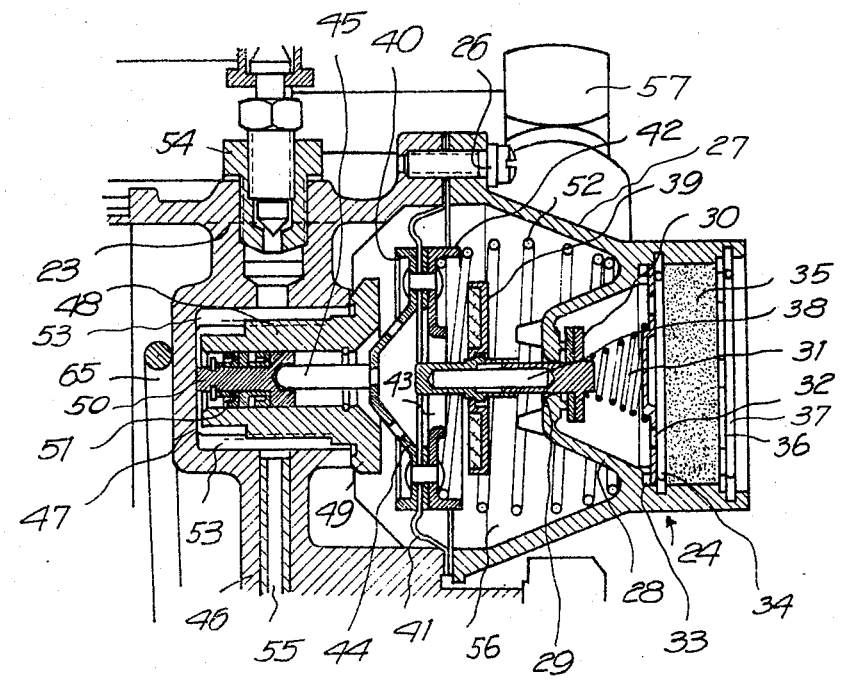
FIG. 4 is a view, on an axial section, of one of the servo-valves of the system of FIG. 1.

In the inoperative position shown in FIG. 4, the negative pressure obtaining in the chamber 4 passes through the aperture 43, the chamber 56, the conduit 57 and the valve 60 to the chamber 3, in such manner that the piston 2 is subjected to equilibrated pressures and is held by a helical spring 65 (FIG. 4) displaced to the maximum extend towards the left in FIG. 1.

When pressure in the control fluid reaches the chambers 11, 13 of the amplifier cylinders 9, 10 via the lines 17 and 18, due to actuation of the controlling double master cylinder 19, the the pistons 7, 8 begin to supply to the output circuits 15, 16 is a partial braking pressure. The same control pressure as is applied to the amplifier cylinders builds up in the cylinder 48 which controls the pneumatic servo-valves 24, 25, displacing the piston 50 towards the right in FIG. 4.

The disphragm 40 is thus deformed towards the right. During this movement, first the member 42 applies the seat surrounding its aperture 43 against the disc 39 in such manner as to interrupt communication between the chamber 56 and the chamber 4, i.e. in effect between the two chambers 3 and 4. The continuing movement towards the right of the diaphragm 40 then moves in the same direction the assembly constituted by the pin 38 and the two valve discs 39, 30, thus opening aperture 29 to establish communication between the chamber 56 and the atmosphere, i.e. to allow flow of atmospheric air, the operating fluid of the cylinder 1, to the chamber 3. Since the chamber 4 is under negative pressure, a pressure difference is established across the piston 2, which is displaced to the right and applies, through the rods 5, a corresponding force to the pistons 7, 8. As is conventional, the diaphragm 40 compares the actuating pressure with the atmospheric pressure, in such manner that with variation of the former there is obtained corresponding modulation of the braking pressure.

On release of the brake, the pistons of the master cylinder 19 travel back, in such manner as to reduce the hydraulic pressure in the cylinders 48 controlling the servo-valves 24, 25. The springs 52, 31 displace the movable assemblies of the said valves towards the left, in such manner that first the passage 29 is closed, thereby interrupting communication of the chamber 56, i.e. of the chamber 3 in the cylinder 1, with the atmosphere; then, the passage 43 is opened, whereby the chamber 56 is connected to the chamber 4 and negative pressure is restored to the chamber 3; the pressures on both faces of the piston 2 are equalised and the spring 65 displaces the pistons 2, 7, 8 towards the left, into the inoperative position. Downstream of the cylinders 9, 10 the usual safety feature is provided, inasmuch as they are independent of the associated circuits 15, 16. If failure should occur in either one of the lines 17, 18, the valve 24, 25 respectively will not be actuated and its outlet conduit 57 will be maintained under negative pressure. With the arrangement of the invention the atmospheric pressure arriving at the valve 60 via the conduit 57 of the other pneumatic valve will apply the ball 64 against one of the seats 62, 63 to block the inoperative inlet, so that the servo-valve which is maintained in operation actuates the servo-cylinder 1.

Figure 6:
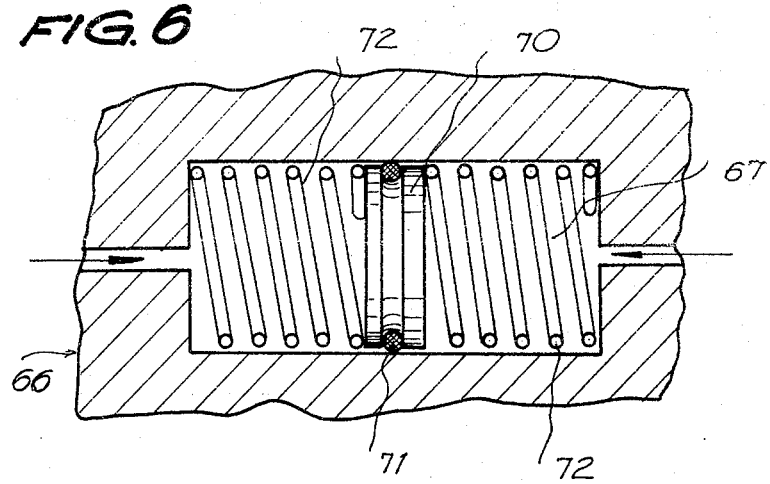
FIG. 6 is a view, on an axial section, of the differential accumulator of the system of FIG. 1.

A differential hydraulic accumulator device 66, shown in detail in FIG. 6, is connected as shown in FIG. 1 between the output circuts 15, 16. It comprises a cylinder 67, sealed at two ends, into which debouch conduits 68, 69, respectively connected to the said circuits 15, 16, and within which there is mounted for sliding a free piston 70 sealed in fluid-type manner by means of a toroidal packing 71 and normally maintained centred between two equal helical springs 72. The capacity of the said accumulator is so calculated that it is adequate to absorb or compensate for non-uniformity of consumption occurring between the two circuits 15, 16 due to non-uniformity of adjustment or wear of the brake elements, but it is sufficiently small that, in the event of failure of one of the circuits, the accumulator 66 may not "absorb" a detrimentally large portion of the cylinder content impelled by the master cylinder 9 or 10 associated with the circuit which is still functioning.

FIG. 2 shows a simplified variant of the system of FIG. 1 described, which functions in accordance with the same working principles. Corresponding elements have been given the same reference numerals. For the sake of convenience, in this case there has not been shown the double master cylinder 19, nor the intake manifold 22. The difference is that one of the hydropneumatic servo-valves (specifically the servo-valve 24) has been dispensed with, so that energisation of the chamber 3 by atmospheric air pressure is effected directly by the outlet conduit 57 of the single valve 25, these being no pneumatic selector valve 60. Control fluid pressure to control the servo-valve 25 is applied to the control inlet 55 via a conduit 73 from the outlet of an hydraulic selector valve 74, the two inlets of which are connected by means of the conduits 75, 76 respectively with the chambers 11, 13 of the master cylinders 9, 10.

Figure 7:
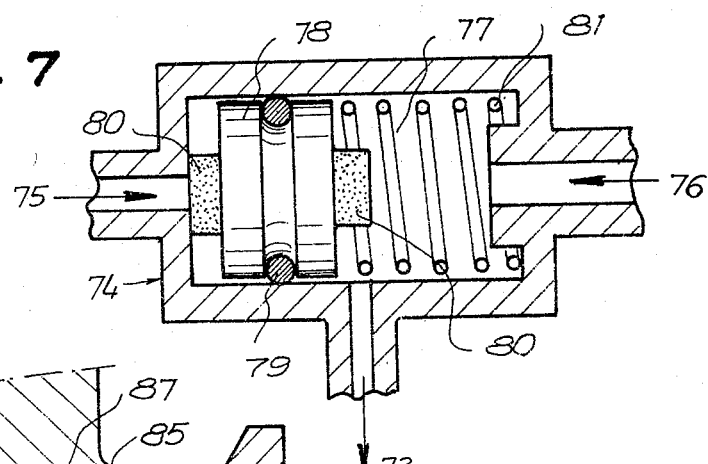
FIG. 7 is a view, on an axial section of the selector valve of the system of FIG. 2.

The selector valve 74 is shown in detail in FIG. 7 and comprises a cylinder 77 sealed at its two ends into which debouch the conduits 75, 76 mentioned hereinabove and which is formed with a central port from which extends the outlet conduit 73. Mounted for sliding within the said cylinder 77 is a shuttle member in the form of a free piston 78 which is rendered fluid-tight by a toroidal packing 79 and the faces of which each carry an obturating means 80 disposed to seal the conduits 75, 76 respectively. A helical spring 81 maintains the piston displaced towards one of the ends, in such manner that one 75 of the inlets is normally closed.

During normal functioning, when control oil flows in through the two conduits, 75, 76, the oil flowing through the second conduit 76 passes freely to the outlet conduit 73 and thence to the servo-valve 25 and the oil flowing through the conduit 75 first displaces the piston 78 until the packing 79 is centred on the conduit port 73, after which instant the servo-motor is controlled by both sides. If the circuit of which the conduit 75 is a part fails, the piston 78 is not displaced from the inoperative position shown and actuation of the valve 25 is completed with the oil flowing from the conduit 76; if, on the other hand, it is the circuit associated with the conduit 76 which fails, the oil flowing through inlet 75 moves the piston 78 until the packing 79 passes beyond the port of the conduit 73, and then travels via the conduit 73 to actuate the valve 25. It should be noted that, in both cases, the control circuit which fails, i.e. in which lower pressure exists, is isolated from the circuit maintained in operation by the selector valve.

Figure 8:
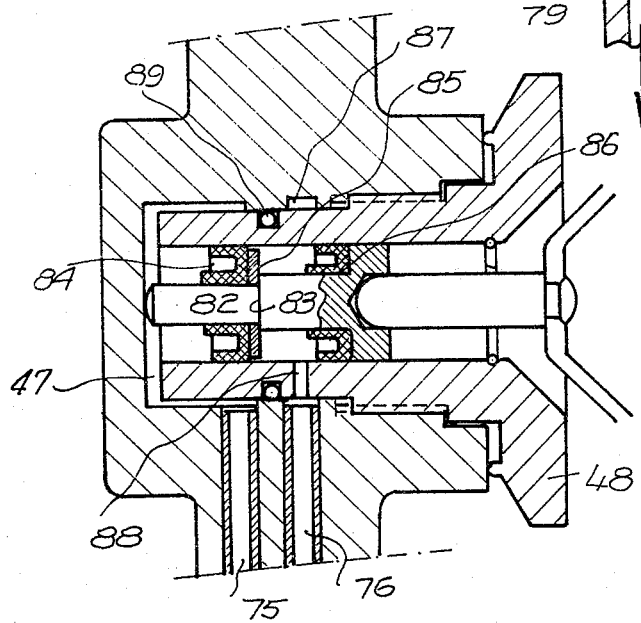
FIG. 8 is a view, on an axial section, of part of the servo-valve of the system of FIG. 3, the remainder of the valve being similar to the valve shown in FIG. 4.

The arrangement of FIG. 3 is analagous to the embodiment described with reference to FIG. 2, with the difference that the hydraulic selector valve 74 is replaced by a different form of selector device located in the servo-valve itself, though the general mode of functioning is the same and corresponding parts are again denoted by the same reference numerals. As shown in FIG. 8, the actuating member 82 (equivalent to piston 50 of FIG. 4) has an intermediate step 83 affording a stop for a piston 84 slidably disposed on the rod 82 and bearing against a washer 85 and axially separated from a piston 86 which is fast with the said rod 82. One of the two control inlets 75, 76, viz. the conduit 75 conveying the control fluid applied to amplifier cylinder 9, debouches into the chamber 47 as in FIG. 4 to act directly on the piston 84, whereas the other conduit 76 conveying the control fluid pressure applied to cylinder 10 debouches into a recess 87 from which a port 88 formed in the cylinder 48 leads to the space between the two pistons 84, 86. A toroidal packing 89 around the cylinder 48 isolates the two circuits from each other in case of failure of one of them.

During normal functioning, oil flows through the two conduits and the piston 86 is displaced in accordance with the sum of the two control pressures received; the piston 84 is displaced from its stop 83 solely to the extent necessary for equalising the pressures on its two faces. When for example the circuit of which the conduit 75 constitutes a part fails, the oil entering through conduit 76 first displaces the piston 84 towards the inner end of the cavity 47 and then urges the piston 86 towards the right, thereby actuating the servo-valve. If the circuit associated with the conduit 76 fails, the pressure in control conduit 75 acts solely against the piston 84 which, via the step 83, actuates the rod 82 to produce the same movement. Thus sufficient pressure in either control inlet actuates the servo-valve.

It is clear that, in both the cases described, the brake installation will function with assistance provided by the servo-motor when circuit failure takes place, both when it takes place downstream and when it takes place upstream of the amplifier-cylinders and servo-motor.

Thus, as is apparent from the above description and drawings, the plurality of amplifier cylinders 9 and 10, which are respectively connected to the plurality of output circuits 15 and 16, respectively have their pistons 7 and 8 connected to a common piston 2 of a servo-means 1, 2 which thus is common to the plurality of amplifier cylinder means 9, 10. Fluid under pressure is supplied to the plurality of amplifier cylinder means 9, 10 from a suitable source which in the illustrated example is the master cylinder means 19, the fluid being supplied through the conduits 17 and 18. At least one servo-valve means 25 is operatively connected with the servo means 1, 2 for normally maintaining equal pressures on opposite sides of the servo piston 2, these equal pressures preferably being less than atmospheric pressure as a result of the connection of the cylinder 1 to the manifold 22 by way of the pipe 21. Thus the component 21, 22 form a source of vacuum for providing less than atmospheric pressure in the servo cylinder 1. The servo valve means 24 is operatively connected with the plurality of amplifier cylinder means 9, 10 to respond automatically to an increase in fluid pressure delivered to the amplifier cylinder means 9, 10 from the source means 19 in order to maintain less than atmospheric pressure on one side of the servo piston 2 while providing an increased pressure on the other side of the piston 2, the latter increased pressure being derived from a source of fluid pressure greater than the equalized pressure normally maintained on opposite sides of the piston 2, and this source of fluid under greater pressure is the atmosphere in the illustrated example. Thus, in this way the pressure greater than the normal equalized pressure on opposite sides of the piston 2 is utilized to drive the latter so as to act through the piston rods 5 on the pistons 7 and 8 of the amplifier cylinder means in order to increase in this way the pressure delivered to the plurality of output circuits 15, 16.

A selector means is operatively connected with at least the servo-valve means 25 for automatically operating the latter with the increased fluid pressure of whichever one of the amplifier cylinders 9, 10 receives from the source means 19 fluid under pressure which reaches a pressure of a given magnitude. This selector means may take the form either of the valve structure 60 shown in FIG. 5, the valve structure 74 shown in FIG. 7, or the selector structure shown in FIG. 8 and formed by the pistons 84 and 86 which operate in the manner described above. Thus, if one of the amplifier cylinders should fail another one which operates properly will serve through the selector means to provide proper actuation for the servo-means 1,2.

While the invention has been illustrated above by reference to preferred but non-limitative embodiments thereof, it will be understood by those skilled in the art that various changes may be made without departing from the spirit and scope of the invention and it is intended to cover all such changes and modifications by the appended claims. With appropriate modifications as to detail, the systems described are applicable to other types of brakes or for purposes differing from those discussed.

What is claimed is:

1. In a fluid pressure system supply source means for supplying fluid under pressure, a plurality of amplifier cylinder means respectively communicating with said supply source means for receiving fluid under pressure therefrom, said plurality of amplifier cylinder means respectively having pistons therein, servo means common to said plurality of amplifier cylinder means and including a servo piston operatively connected with the plurality of pistons of said plurality of amplifier cylinder means, said servo means including a single servo cylinder housing said servo piston and defining therewith a pair of chambers respectively situated on opposite sides of said servo piston, a relatively low fluid pressure source communicating with one of said chambers, servo-valve means communicating with said plurality of amplifier cylinder means, with said chambers of said servo cylinders , and with a relatively high fluid pressure source of fluid at pressure substantially higher than the pressure of the fluid of said relatively low pressure source which communicates with said one chamber, for normally maintaining pressures in both chambers on opposite sides of said servo piston equalized at the pressure of said relatively low fluid pressure source and for automatically responding to an increase in fluid pressure in said amplifier cylinders, derived from said supply source, to a predetermined value for maintaining said one chamber at said relatively low pressure while placing the other of said chambers in communication with said relatively high fluid pressure source for displacing said servo piston to act additionally on said pistons in said plurality of amplifier cylinder means with the differential pressure acting on said servo piston, a plurality of output circuits respectively communicating with said plurality of amplifier cylinder means for receiving fluid under amplified pressure therefrom, and selector means operatively connected with said servo-valve means for operating the latter automatically with fluid under pressure in any one of said plurality amplifier cylinder means which reaches said predetermined value, so that if one of said plurality of amplifier cylinder means does not have a fluid pressure which reaches said predetermined value another one of which has a fluid pressure reaching said predetermined value will serve to actuate said servo-valve means through said selector means.

2. The combination of claim 1 and wherein said servo-valve means includes a plurality of servo-valves respectively communication with said plurality of amplifier cylinder means and each communicating with said relatively high fluid pressure source, said selector means being connected between said plurality of servo-valves and said other chamber for providing communication between said other chamber and at least one of said servo-valves which communicates with an amplifier cylinder means having therein a pressure which reaches said predetermined value.

3. The combination of claim 1 and wherein said servo-valve means includes a single servo-valve communicating with said plurality of amplifier cylinder means and said selector means being connected between said plurality of amplifier cylinder means and said single servo-valve for operating the latter with pressure from at least one amplifier cylinder means wherein the pressure reaches said predetermined value.

4. The combination of claim 1 and wherein said servo-valve means includes a single servo-valve communicating with said plurality of amplifier cylinder means, said selector means including in said servo-valve a single cylinder and a plurality of pistons in said single cylinder and respectively communicating through said single servo-valve with said plurality of amplifier cylinder means so that at least one of the latter pistons can respond to fluid pressure in at least one amplifier cylinder means which reaches said predetermined value for actuating said servo-valve.

5. The combination of claim 1 and wherein said supply source means, said plurality of amplifier cylinder means, and said plurality of output circuit means are hydraulic while said servo means, said realtively low fluid pressure source and said relatively high fluid pressure source are pneumatic with said servo-valve means having a hydraulic portion cooperating with said plurality of amplifier cylinder means and a pneumatic portion cooperating with said servo means and said relatively high fluid pressure source.

6. The combination of claim 5 and wherein said plurality of output circuits respectively deliver fluid under pressure to brakes of a vehicle, said supply source means being a master cylinder.

7. The combination of claim 6 and wherein said source of relatively low fluid pressure is an intake manifold of an engine of the vehicle while said relatively high fluid pressure source is the outer atmosphere.

8. The combination of claim 1 and wherein a differential accumulator means communicates with said plurality of output circuits for compensating for differences in consumption of fluid by said plurality of output circuits while having a capcity small enough not to impair the functioning of one of said output circuits if another one fails.

9. The combination of claim 1 and wherein said source of relatively high pressure is the outer atmosphere while said source of relatively low pressure provides less than atmospheric pressure, said servovalve means having an outer portion communicating with the outer atmosphere, an inner portion communicating with said one chamber, and an intermediate portion situated between said outer and inner portions and communicating with said other chamber, an outer normally closed valve situated between said outer and intermediate portions for normally preventing communication between the outer atmosphere and said intermediate portion, and an inner normally open valve providing normally communication between said intermediate and inner portions for normally maintaining said chambers on opposite sides of said servo piston at an equalized pressure equal to the pressure of said relatively low fluid pressure source, said servo-valve means including a cylinder communicating with at least onoe of said amplifier cylinder means and a piston in the latter cylinder operatively connected with said inner and outer valves for closing said normally open inner valve and opening said normally closed outer valve when fluid under pressure in said one amplifier cylinder means acts on said piston in said cylinder of said servo-valve means upon reaching a pressure equal to said predetermined value.

10. The combination of claim 9 and wherein said outer valve has a stationary valve seat and movable valve-closure member cooperating therewith while said inner valve has a movable valve seat connected directly to said piston of said servo-valve means and a movable valve closure member connected with said movable valve closure member of said outer valve, the latter piston acting on said movable seat for first closing said inner valve and then acting through said movable valve closure member of said inner valve to displace said movable valve closure member of said outer valve away from said stationary valve seat thereof for opening said outer valve subsequent to closing of said inner valve.

* * * * *